United States Patent [19]

Vogel et al.

[11] 4,003,885
[45] Jan. 18, 1977

[54] TETRAKISAZO COMPOUNDS HAVING A 1-HYDROXY-2-(4'-(2''-SULFOANILINO)-PHENYLAZO)-3,6-DISULFO-7-(OPTIONALLY 2'-SUBSTITUTED PHENYLAZO-8-AMINONAPHTHALENE MIDDLE COMPONENT

[75] Inventors: Claude Vogel, Saint-Louis, France; Heinz Wicki, Basel, Switzerland

[73] Assignee: Sandoz Ltd., Basel, Switzerland

[22] Filed: July 2, 1974

[21] Appl. No.: 485,281

[30] Foreign Application Priority Data
July 9, 1973 Switzerland ............ 9953/73

[52] U.S. Cl. .............. 260/166; 260/159; 260/168; 260/171; 260/174; 260/186; 260/198; 260/558 P; 260/571; 260/575; 260/576; 260/578

[51] Int. Cl.² .............. C09B 31/30; C09B 33/18; C09B 35/36; C09B 35/50

[58] Field of Search ............ 260/166, 168, 171

[56] References Cited

UNITED STATES PATENTS

| | | | |
|---|---|---|---|
| 613,645 | 11/1898 | Rosenberg | 260/171 |
| 1,789,888 | 1/1931 | Wolfsleben | 260/168 |
| 2,196,028 | 4/1940 | Roos | 260/166 |
| 2,202,350 | 5/1940 | Lier | 260/171 |
| 2,228,415 | 1/1941 | Sparks et al. | 260/145 |
| 2,248,074 | 7/1941 | Glietenberg et al. | 260/171 |
| 2,270,675 | 1/1942 | Stein et al. | 260/166 |
| 2,842,538 | 7/1958 | Byland | 260/168 |
| 2,966,483 | 12/1960 | Gies | 260/171 |

FOREIGN PATENTS OR APPLICATIONS

| | | | |
|---|---|---|---|
| 153,557 | 4/1901 | Germany | 260/171 |
| 1,105,350 | 3/1968 | United Kingdom | 260/166 |
| 795,232 | 5/1958 | United Kingdom | 260/166 |

*Primary Examiner*—Floyd D. Higel
*Assistant Examiner*—John J. Doll
*Attorney, Agent, or Firm*—Gerald D. Sharkin; Richard E. Vila; Melvyn M. Kassenoff

[57] ABSTRACT

Compounds of the formula

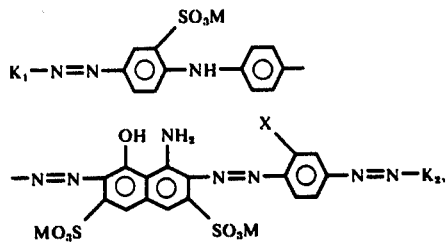

in which
  X signifies hydrogen, halogen or $-SO_3M$,
  M signifies hydrogen or a non-chromophoric cation, and
  $K_1$ and $K_2$, which are the same or different, each signifies a coupling component which has at least one free amino, enolic hydroxy or phenolic hydroxy group, and mixtures thereof, are useful as anionic dyes for natural and regenerated cellulose, natural and synthetic polyamides, polyurethanes, basically modified polyolefins, paper and, particularly, leather. The dyes are well-soluble in water, resistant to acid, have relatively low substantivity on leather, produce level dyeings and have no hardening effect on chrome-tanned leather and exhibit good fastness to light and wet treatments on paper. Also disclosed are compounds of the formula

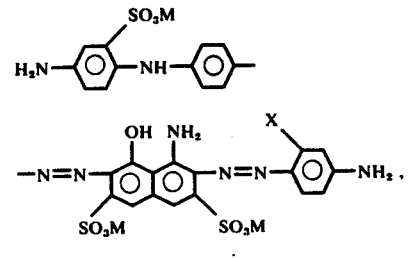

wherein M and X are as defined above, which are useful as intermediates.

22 Claims, No Drawings

TETRAKISAZO COMPOUNDS HAVING A 1-HYDROXY-2-(4'-(2''-SULFOANILINO)-PHENYLAZO)-3,6-DISULFO-7-(OPTIONALLY 2'-SUBSTITUTED PHENYLAZO)-8-AMINONAPHTHALENE MIDDLE COMPONENT

The invention relates to azo dyestuffs.

According to one aspect of the invention, there are provided tetrakisazo compounds of formula I,

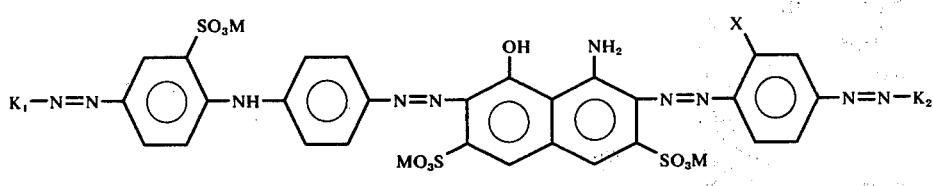

in which
- X signifies hydrogen, halogen or —SO$_3$M,
- M signifies hydrogen or a non-chromophoric cation, and
- K$_1$ and K$_2$, which are the same or different, each signifies a coupling component which has at least one free amino, enolic hydroxy or phenolic hydroxy group, and mixtures of compounds of formula I.

In the compounds of formula I, where X signifies halogen, such may be fluorine, chlorine, bromine or iodine, preferably fluorine, chlorine or bromine and most preferably chlorine.

Where M signifies a cation, the exact nature thereof is not critical, provided it is non-chromophoric. Cations generally used for salt formation in anionic dyes may be employed. As examples of such cations may be given the alkali metal cations, such as of lithium, sodium and potassium, the ammonium and alkyl- and alkanolammonium cations, e.g. mono-, di- and tri-alkanolammonium cations, in which the alkanol moieties contain, for example, two or three carbon atoms. The preferred cations are the alkali metal and ammonium cations. For the sake of simplicity, M has been shown in the formulae herein to be monovalent. Di- and poly valent cations are, however, embraced by the invention.

Preferred coupling components as K$_1$ and K$_2$ are those derived from compounds of formulae (a), (b), (c) and (d),

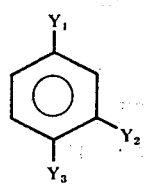
(a)

in which either
- Y$_1$ signifies —OH or —NH$_2$,
- Y$_2$ signifies —OH, —NH$_2$, anilino or toluidino, and
- Y$_3$ signifies hydrogen or —SO$_3$M, or
- Y$_1$ and Y$_2$ both signify —NH$_2$, and
- Y$_3$ signifies hydrogen, —SO$_3$M or C$_{1-6}$alkyl;

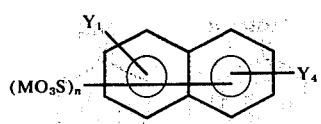
(b)

in which
- Y$_1$ and M are as defined above,
- Y$_4$ signifies hydrogen, —OH, —NH$_2$, anilino, toluidino or acetylamino, and
- n is 0, 1 or 2;

$$CH_3-CO-CH=C-NH-\bigcirc \quad (c)$$
$$\qquad\qquad\qquad |$$
$$\qquad\qquad\qquad OH$$

(d) [pyrazole structure]

in which
- Y$_5$ signifies —OH or —NH$_2$,
- R$_1$ signifies C$_{1-6}$alkyl, C$_{1-6}$alkoxy, acetyl, —COOH or —CONH$_2$,
- R$_2$ signifies hydrogen, acyl, unsubstituted or substituted C$_{1-6}$alkyl, unsubstituted or substituted phenyl or unsubstituted or substituted naphthyl.

Any alkyl or alkoxy radical of 1 to 6 carbon atoms is preferably of 1, 2, 3 or 4 carbon atoms; ethyl, ethoxy, methyl and methoxy, particularly the latter two, being most preferred.

As examples of substituents on any substituted alkyl radical as R$_2$ may be given C$_{1-6}$, preferably C$_{1-4}$, alkoxy, chlorine, cyano and hydroxy, any substituted alkyl radical preferably being monosubstituted.

As examples of substituents on any substituted phenyl radical as R$_2$ may be given C$_{1-6}$, preferably C$_{1-4}$, alkyl, or alkoxy, halogen, —SO$_3$M, —NO$_2$, cyano and —NH$_2$. Preferred substituted phenyl radicals are those bearing up to a total of three substituents selected from up to three substituents selected from alkyl and halogen, up to two substituents selected from alkoxy and nitro and one substituent selected from —SO$_3$M, cyano and —NH$_2$. The preferred halogens are as described above for X.

Any substituted naphthyl radical preferably bears as substituents one or two —SO$_3$M groups.

Any acyl radical as R$_2$ is preferably a lower, e.g. (C$_{1-6}$, preferably C$_{1-4}$, alkyl) carbonyl group, the preferred acyl radical being the acetyl radical.

Particularly preferred compounds of formula (a) are the compounds of formulae (a$_1$), (a$_2$), (a$_3$), (a$_4$), (a$_5$), (a$_6$) and (a$_7$),

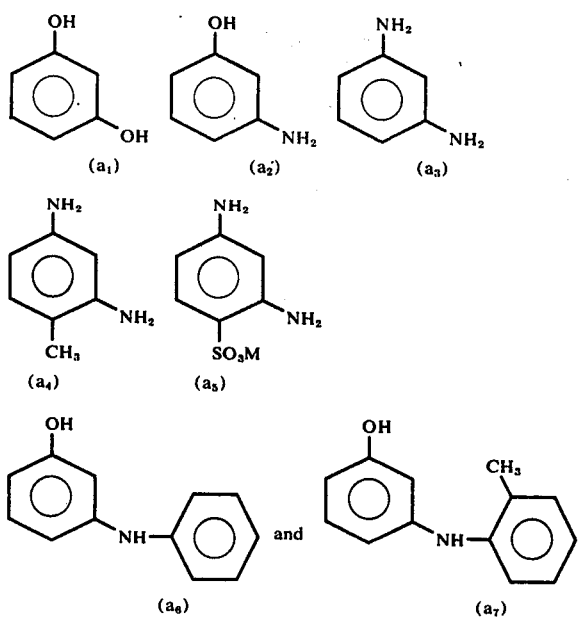

Particularly preferred compounds of formula (b) are the compounds of formulae ($b_1$), ($b_2$), ($b_3$), ($b_4$), ($b_5$), ($b_6$), ($b_7$), ($b_8$) and ($b_9$)

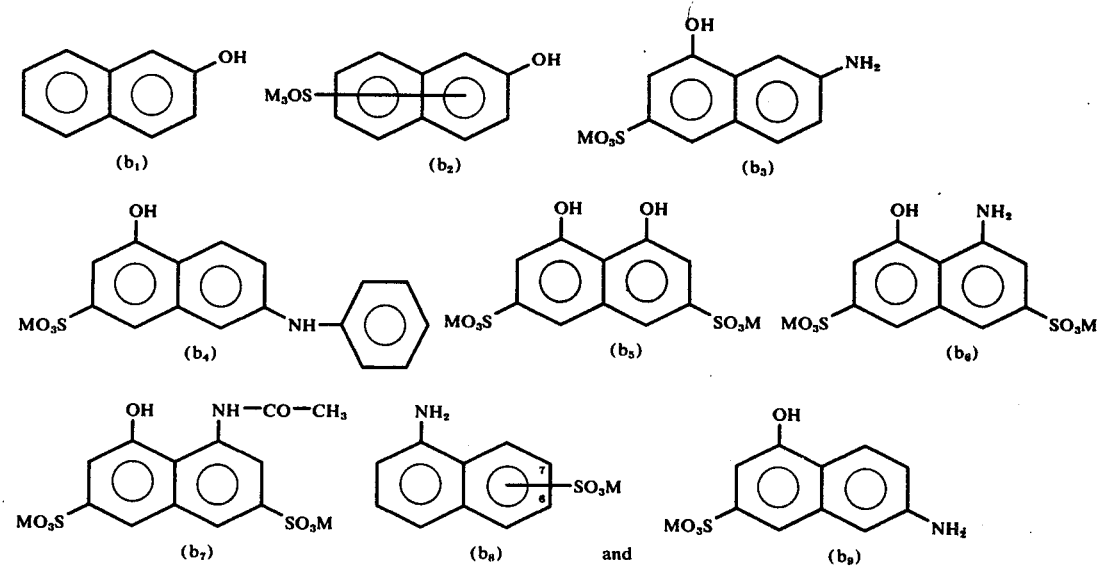

more particularly ($b_1$), ($b_2$), ($b_3$), ($b_8$) and ($b_9$).

Particularly preferred compounds of formula (d) are 1-phenyl-3-methyl-pyrazolone-5 and 1-(sulpho-phenyl)-3-methylpyrozolone-5, particularly the former.

Especially preferred compounds from which $K_1$ and $K_2$ are derived are the compounds of formulae ($a_1$), ($a_2$), ($a_3$), ($a_4$), ($a_5$), ($a_6$), ($a_7$), ($b_1$), ($b_2$), ($b_3$), ($b_8$) or ($b_9$).

The invention also provides a process for the production of compounds of formula I and mixtures thereof, characterised by coupling a bis-diazo derivative of a diamine of formula II,

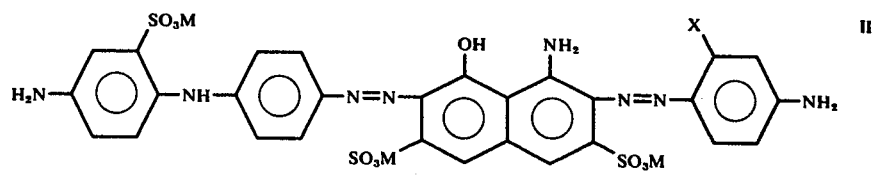

in which M and X are as defined above, with a compound of formula III $$K_1 - H \qquad \qquad III$$

in which $K_1$ is as defined above, and a compound of formula IV, $$K_2 - H \qquad \qquad IV$$

in which $K_2$ is as defined above.

As will be appreciated, where $K_1$ and $K_2$ are the same, the compounds of formulae III and IV are identical. The bisdiazotisation and coupling reactions may be carried out in conventional manner. Thus, they may be carried out in aqueous or aqueous/organic media. The coupling may be effected under acidic, neutral or alkaline conditions, acid conditions being obtained, for example, by addition of inorganic acids, and alkaline conditions, for example, by addition of ammonium and alkali-metal bases, e.g. ammonium hydroxide or lithium, sodium or potassium carbonate or bicarbonate.

Coupling accelerators, such as guanidine, pyridine, quinoline or urea, may also be used.

As will be appreciated, where the compounds $K_1$—H and $K_2$—H are different, mixtures of compounds of formula I are generally obtained, such mixtures may be employed as hereinafter described or separated, if desired. Where the compounds $K_1$—H and $K_2$—H are different, preferred mixtures of compounds of formula I are obtained by using mol ratios of compound $K_1$—H to $K_2$—H of 1:9 to 1:1, preferably 1:4 to 1:1. Preferred mixtures are obtained by employing different compounds of formula (a); different compounds of formula (b); different compounds of formula (d), where $Y_5$ is —OH, or a compound of formula (d) where Y is —OH with a compound of formula (c), particularly preferred mixtures being those obtained using compounds of formula $(a_2)$ and $(a_3)$, $(a_4)$ or $(a_7)$ any two of $(b_3)$, $(b_8)$ and $(b_9)$; and 1-phenyl-3-methylpyrazolone-5 with acetoacetic acid anilide.

The resulting compounds of formula I and mixtures thereof may be isolated and purified in conventional manner.

The compounds of formula II, used in the above process for the production of compounds of formula I are novel and form a further aspect of the invention.

The invention also provides a process for the production of compounds of formula II, stated above, characterised by reducing a dinitro compound of formula III',

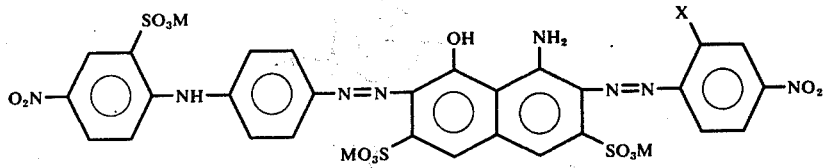

in which the M's and X are as defined above.

The reduction is conveniently carried out in conventional manner for the reduction of nitro to amino groups, preferably using mild reducing conditions, e.g. using sodium sulphide as the reducing agent.

The resulting compounds of formula II may be isolated and purified in conventional manner, e.g. by salting out from the reaction mixture.

The compounds of formula III', used above, may be obtained by coupling a diazo derivative of an amine of formula IV',

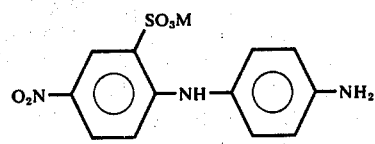

in which M is as defined above, with a compound of formula V,

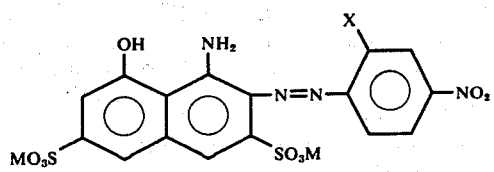

in which the M's and X are as defined above, at a pH of from 4 to 11.

The above process may be carried out in conventional manner, e.g. as described above in connection with the process for producing compounds of formula I.

The compounds of formula V, stated above, may be obtained by reacting a diazo derivative of an amine of formula VI,

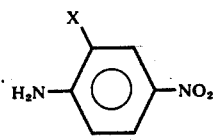

in which X is as defined above, with a compound of formula VII,

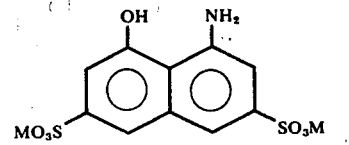

in which the M's are as defined above, at a pH of from 1 to 3.

Again, the above process may be carried out in conventional manner.

The compounds of formulae IV', VI and VII are either known or may be obtained in conventional manner from available starting materials.

The compounds of formula I and mixtures thereof are useful as anionic dyes and may be employed alone or in admixture with other dyes in the dyeing of anionic dyeable substrates, whether of a textile or non-textile nature. As examples of such substrates may be given, for example, natural and regenerated cellulose, natural and synthetic polyamides, polyurethanes or basically modified polyolefins, in particular basically modified polypropylene. The substrates may be in any conventional form, e.g. as loose fibre, filament, yarn, non-woven, paper, felt, carpet, knitted, or like form. Particularly suitable natural fibre materials are cotton, wool and silk and of the synthetics, nylon and basically modified polypropylene. The dyes according to the invention are preferably used for the dyeing of cellulose non-wovens and paper. However, above all, they are particularly suitable for the dyeing of leather. The dyes according to the invention may be used by any method suited to the substrates being dyed, e.g. exhaust dyeing, padding or printing. Dark blue and dark green to deep black dyeings are obtained depending on the particular compound employed.

The tetrakisazo dyes according to the invention, particularly the preferred such dyes, are readily soluble in water and are resistant to acid, they have optimum, relatively low substantivity, in particular on leather, and produce good grain dyeings. In addition, they do not have any hardening effect on chrome-tanned leather.

The following Examples, in which all parts and percentages are by weight and temperatures in degrees centigrade, illustrate the invention.

EXAMPLE 1

138 Parts p-nitroaniline are diazotised in the usual way with hydrochloric acid and Na nitrite, and coupled at a pH of 1-3 with 319 parts 1-amino-8-hydroxynaphthalene-3,6-disulphonic acid. The diazo compound from 309 parts 4-amino-4'-nitro-2'-sulphodiphenylamine is coupled to the monoazo compound obtained at a pH of 9.5. The dinitro-diazo compound obtained is reduced at 40° in the reaction mixture with a solution of 234 parts Na sulphide in water. The dyestuff is separated off by sprinkling on common salt and adjusting the pH to 1.5. The dyestuff obtained is stirred together with diluted hydrochloric acid and the whole is tetrazotised by adding 140 parts Na nitrite solution drop by drop. 216 Parts 1,3-diaminobenzene dissolved in water are added to the tetrazotised dyestuff and coupling is effected at pH 9. The dyestuff obtained is precipitated with acid. It is in the form of a black powder which dyes leather, paper, natural and synthetic polyamides or cotton in black, deep shades.

If 2-chloro-4-nitroaniline or 2-sulpho-4-nitroaniline are used instead of p-nitroaniline, more greenish-black dyes with equally good properties are obtained. If 1-amino-3-hyroxybenzene or 3-hydroxy-2'-methyldiphenylamine are used in place of 1,3-diaminobenzene more greenish or reddish black shades with equally good properties are obtained. If 1,3-diamino-4-sulphobenzene is used in place of 1,3-diaminobenzene, a readily soluble dye with similar fastness properties is obtained.

Table 1 shows the structure of these and other dyestuffs which can be produced in accordance with the description given in Example 1 and which correspond to formula I, in which X, $K_1$ and $K_2$ are as shown in the relevant columns and M is hydrogen.

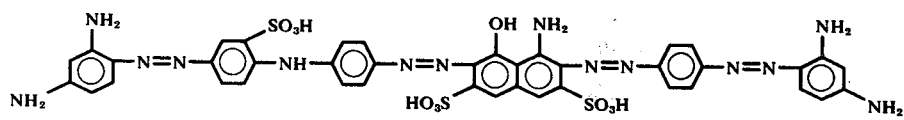

Table 1

| Example No. | —X | $K_1$ and $K_2$ | Shade of the dyeing on leather |
|---|---|---|---|
| 2 | —H | (OH, NH₂ phenyl) | greenish-black |
| 3 | —H | (OH, NH-phenyl) | '' |
| 4 | —H | (OH, NH-phenyl with CH₃) | '' |

Table 1-continued
| Example No. | —X | $K_1$ and $K_2$ | Shade of the dyeing on leather |
|---|---|---|---|
| 5 | —H | 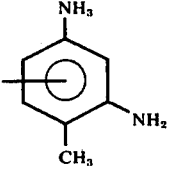 | black |
| 6 | —H | 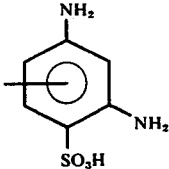 | " |
| 7 | —H | 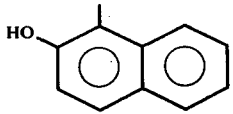 | blue |
| 8 | —H | 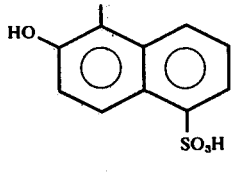 | " |
| 9 | —H | $CH_3-CO-CH-CO-NH-$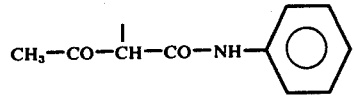 | green |
| 10 | —H | 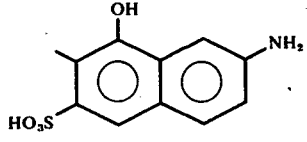 | blue |
| 11 | —H | 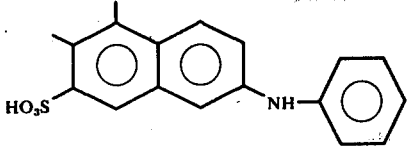 | " |
| 12 | —H | 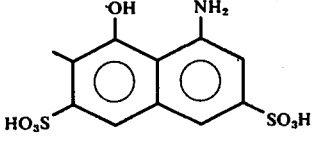 | " |
| 13 | —H | 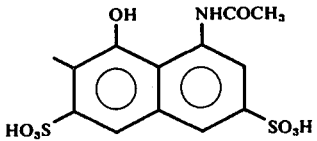 | " |
| 14 | —H | 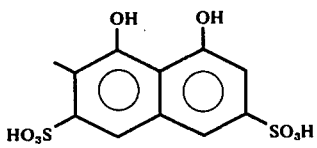 | " |

Table 1-continued

| Example No. | —X | K₁ and K₂ | Shade of the dyeing on leather |
|---|---|---|---|
| 15 | —H | 3-methyl-1-(4-sulfophenyl)-5-hydroxypyrazole | green |
| 16 | —H | 3-methyl-1-phenyl-5-hydroxypyrazole | " |
| 17 | —H | 5-amino-naphthalene-2-sulfonic acid (1,5-/2 pattern) | blue |
| 18 | —H | 8-amino-naphthalene-2-sulfonic acid | " |
| 19 | —H | 1-hydroxy-6-amino-naphthalene-3-sulfonic acid | " |
| 20 | —SO₃H | m-phenylenediamine | black |
| 21 | —SO₃H | m-aminophenol | greenish-black |
| 22 | —SO₃H | 5-amino-naphthalene-2-sulfonic acid | blue |
| 23 | —SO₃H | 1-hydroxy-6-amino-naphthalene-3-sulfonic acid | " |
| 24 | —SO₃H | CH₃—CO—CH—CO—NH—C₆H₅ | |

Table 1-continued

| Example No. | —X | K₁ and K₂ | Shade of the dyeing on leather |
|---|---|---|---|
| 25 | —SO₃H | [pyrazolone: HO-C=N-N(phenyl), with CH₃] | green |
| 26 | —Cl | 1,3-diaminobenzene (NH₂, NH₂) | black |
| 27 | —Cl | 3-aminophenol (NH₂, OH) | greenish-black |
| 28 | —Cl | aminonaphthalene sulfonic acid (NH₂, SO₃H) | blue |
| 29 | —Cl | OH, HO₃S, NH₂ naphthalene | " |
| 30 | —Cl | —CH—CO—NH—(phenyl), CO, CH₃ | green |
| 31 | —Cl | [pyrazolone: HO-C=N-N(phenyl), CH₃] | " |

If in Example 1 the 216 parts 1,3-diaminobenzene are replaced by the equivalent quantity of one of the mixtures shown in Table 2 below, dye mixtures which have similar properties and which produce on leather dyeings of the shades indicated in the relevant column are obtained.

Table 2

| Example No. | Mixtures of coupling components | Molar ratio of the coupling components | Shade of the dyeing on leather |
|---|---|---|---|
| 32 | 1,3-diaminobenzene (NH₂, NH₂) | 70 % | black |

Table 2-continued

| Example No. | Mixtures of coupling components | Molar ratio of the coupling components | Shade of the dyeing on leather |
|---|---|---|---|
|  | 3-aminophenol | 30 % |  |
| 33 | 1-amino-naphthalene-6-sulfonic acid | 50 % | blue |
|  | 1-hydroxy-3-sulfo-6-amino-naphthalene | 50 % |  |
| 34 | CH₃CO—CH₂—CO—NH—phenyl (acetoacetanilide) | 70 % | green |
|  | 1-phenyl-3-methyl-5-hydroxypyrazole | 30 % |  |

Among the preferred compounds of this application are those of the formulae

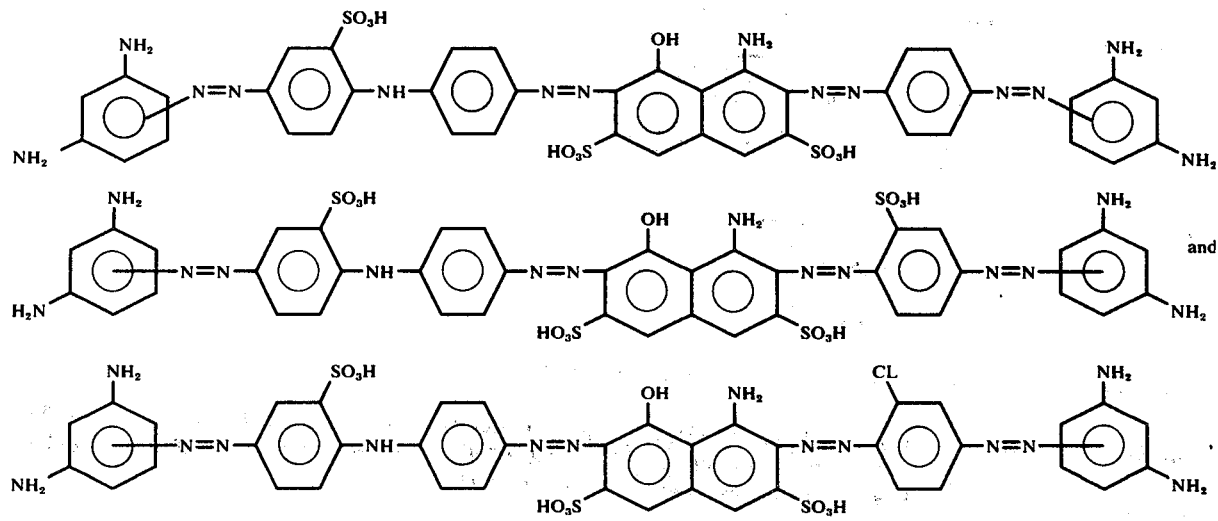

and salts thereof, particularly the sodium salts thereof.

Dyeing Example A

100 Parts freshly tanned and neutralised full grained chrome leather are drummed for 30 minutes in a dyeing drum in a liquor consisting of 250 parts water at 55° and 1 part of the dyestuff described in Example 1. The leather is then treated in the same bath for a further 30 minutes with 2 parts of an anionic fat-liquor on a sulphonated fish-oil basis. It is then dried and finished in the usual way. A very level dyeing in a blue-black shade is obtained.

Dyeing Example B

100 Parts calf suede leather are drummed in a dyeing drum for 4 hours with 1000 parts water and 2 parts ammonia. The leather is subsequently dyed in a dyeing drum over the course of 1½ hours with 500 parts water at 55°, 2 parts ammonia and 10 parts of the dissolved dyestuff described in Example 1. 4 Parts formic acid

17

(85%) are added slowly to exhaust the dyeing liquor and dyeing is continued until the dye is completely fixed. The suede leather is rinsed, dried and finished in the usual way, the suede side is fluffed and a deep blue-black, very level dyeing is obtained.

Dyeing Example C

100 Parts lamb leather which has been chrome-vegetable tanned and 10 parts of the dye produced according to Example 1 are drummed for 45 minutes in a dyeing drum in a liquor consisting of 1000 parts water at 55° and 1.5 parts of an anionic sperm oil emulsion. The dye is fixed on the leather by the gradual addition of 5 parts formic acid (85%) over the course of 30 minutes. After drying and finishing in the usual way, a very level deep blue-black dyeing is obtained.

Dyeing Example D

A solution of 20 parts of the dyestuff produced according to Example 1 in 847 parts water, 150 parts ethylene glycol and 3 parts formic acid (85%) are applied by spraying, plush-wheeling and pouring on to the grain side of buffed box sides which have been combination tanned. The leather is dried and finished under mild conditions. A deep blue-black dyeing with good fastness properties is obtained.

Dyeing Example E 260 ml. water at 50° – 60° are put into a dyeing beaker with a capacity of 500 ml. which is placed in a heatable water bath. 10 ml. 10% sodium sulphate solution and 1 ml. 10% sodium carbonate solution are then added. 0.25 g of the dyestuff from Example 1 are stirred well with 2 ml. cold water to form a paste and 30 ml. warm water (50° – 60°) are added which causes the dyestuff to dissolve. The dyestuff solution is added to the prepared liquor and 10 g cotton fabric are kept in constant movement in this dyeing liquor. The temperature of the dyeing liquor is increased to 85° – 90° over the course of 30 minutes and dyeing is continued at this temperature for 60 minutes. The dyed material is removed from the dyeing liquor, it is wrung out to remove any remaining liquor, it is then rinsed with cold water for 5 – 10 minutes and finally dried at 60° – 70°.

Paper Dyeing Examples F a. 100 Parts chemically bleached sulphite cellulose (from either conifers or deciduous trees) are ground in a beater together with 2000 parts water. 4 Parts of the dyestuff from Example 1 in powder or solution form are added to this pulp. After 15 minutes, sizing is carried out, followed by fixing. The paper produced from this pulp is dyed a deep blue-black shade and the dyeing has good wet and light fastness properties.

b. 70 Parts chemically bleached sulphite cellulose (from conifers) and 30 parts chemically bleached sulphate pulp (from birch wood) in 2000 parts water are beaten in a pulper. 0.4 Parts of the dyestuff from Example 1 are sprinkled on to this pulp or are added in solution form. After 20 minutes, paper is produced from this pulp. The paper produced is dyed grey and has good fastness properties.

If an equivalent amount of one of the dyestuffs from Examples 2 – 34 is used in place of the dyestuff from Example 1 in the above Examples A – F, dyeings with similar fastness properties are obtained.

In the above dyeing examples the dyes were admixed with sodium carbonate before use.

What is claimed is:
1. A dye of the formula

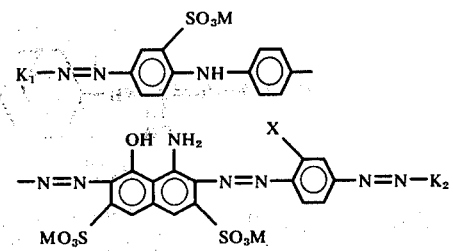

or a mixture thereof, wherein X is hydrogen, halo or —SO$_3$M, each of K$_1$ and K$_2$ is independently the radical of a coupling component of the formula

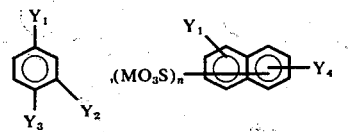

or

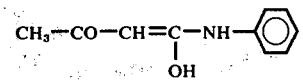

wherein
Y$_1$ is —OH or —NH$_2$,
Y$_2$ is —OH, —NH$_2$, anilino or toluidino,
Y$_3$ is hydrogen, —SO$_3$M or alkyl of 1 to 6 carbon atoms, with the proviso that when Y$_3$ is alkyl of 1 to 6 carbon atoms, Y$_1$ and Y$_2$ are —NH$_2$,
Y$_4$ is hydrogen, —OH, —NH$_2$, anilino, toluidino or acetamido, n is 0, 1 or 2, and each M is hydrogen or a non-chromophoric cation, wherein each halo is independently fluoro, chloro, bromo or iodo.
2. A dye according to claim 1.
3. A dye according to claim 1, or a mixture thereof, wherein Y$_3$ is hydrogen, —SO$_3$M or alkyl of 1 to 4 carbon atoms.
4. A dye according to claim 3, or a mixture thereof, wherein Y$_3$ is hydrogen, —SO$_3$M, methyl or ethyl.
5. A dye according to claim 1, or a mixture thereof, wherein each of K$_1$ and K$_2$ is independently the radical of a coupling component of the formula

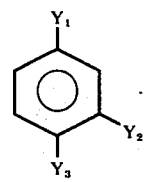

6. A dye according to claim 1, or a mixture thereof, wherein each of K$_1$ and K$_2$ is independently the radical of a coupling component of the formula

7. A dye according to claim 1, or a mixture thereof, wherein each of $K_1$ and $K_2$ is independently the radical of a coupling component of the formula

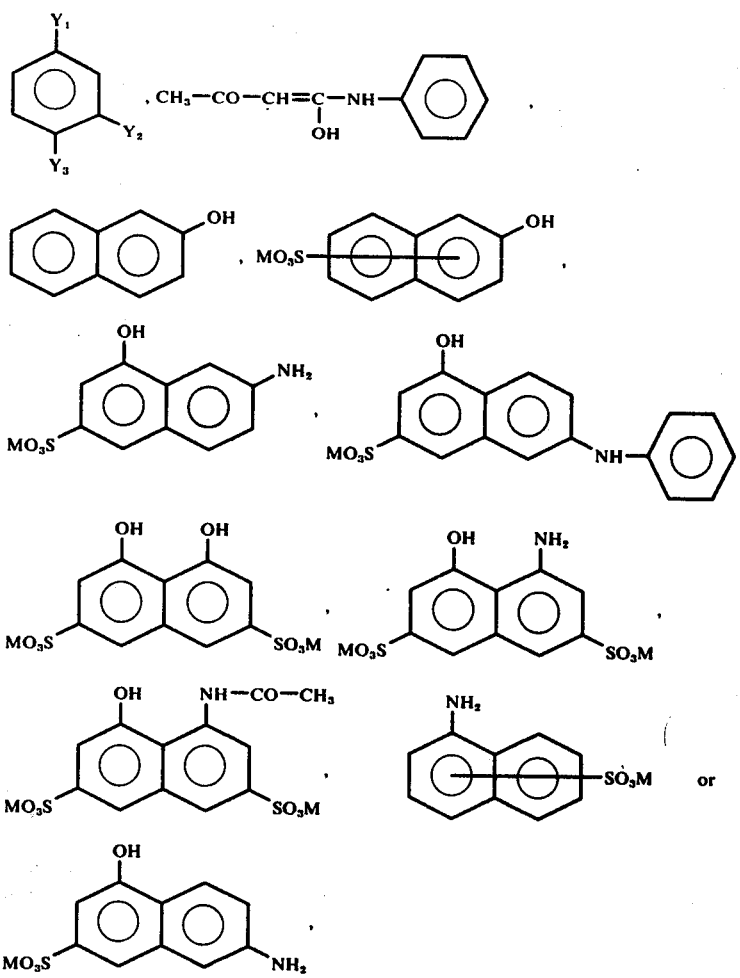

with the proviso that at least one of $K_1$ and $K_2$ is the radical of a coupling component other than 8. A dye according to claim 7, or a mixture thereof, wherein each of $K_1$ and $K_2$ is independently the radical of a coupling component of the formula

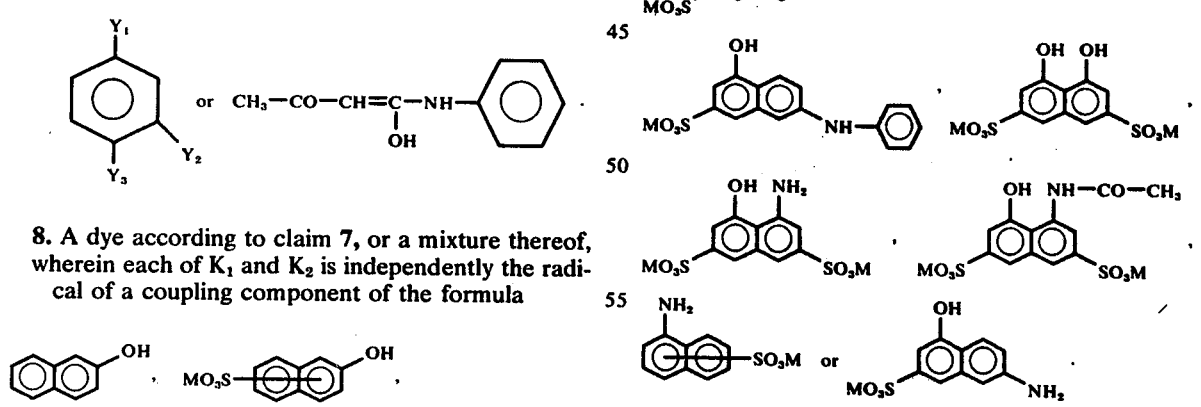

9. A dye according to claim 1, or a mixture thereof, wherein each of $K_1$ and $K_2$ is independently the radical of a coupling component of the formula

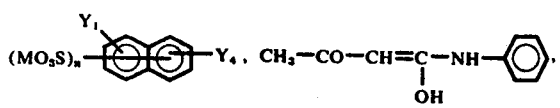

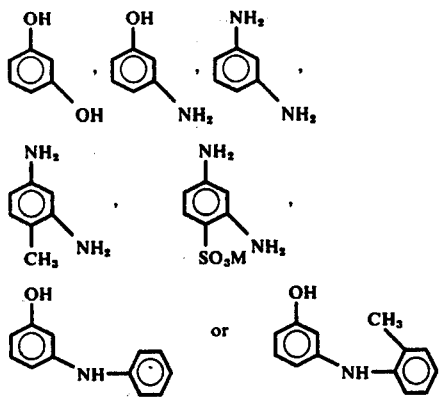

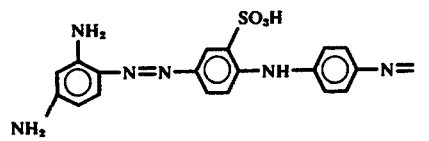

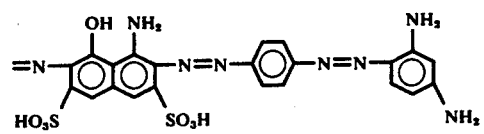

with the proviso that at least one of $K_1$ and $K_2$ is the radical of a coupling component other than

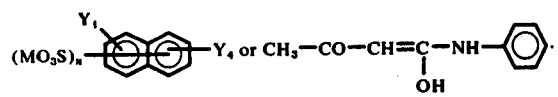

10. A dye according to claim 9, or a mixture thereof, wherein each of $K_1$ and $K_2$ is independently the radical of a coupling component of the formula

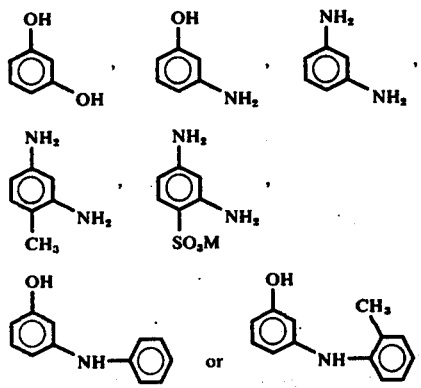

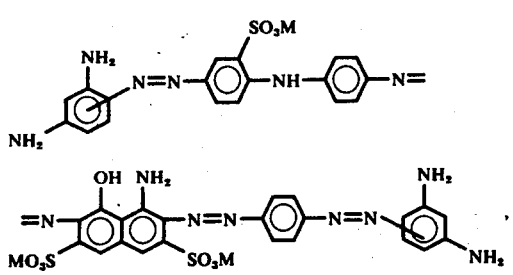

11. A dye according to claim 10 having the formula

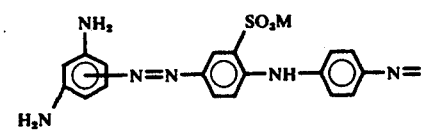

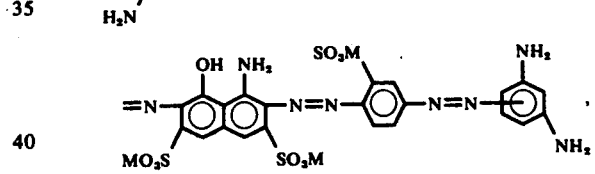

or a mixture thereof.

12. A dye according to claim 11.
13. A dye according to claim 12 wherein each M is sodium.
14. The dye according to claim 12 having the formula 15. A dye according to claim 11, or a mixture thereof, wherein each M is sodium.
16. A dye according to claim 10 having the formula

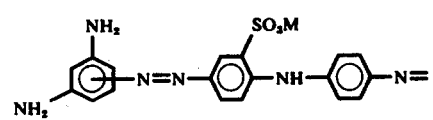

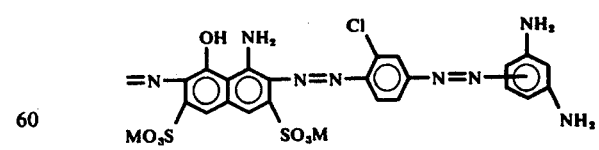

or a mixture thereof.

17. A dye according to claim 16.
18. A dye according to claim 17 wherein each M is sodium.
19. A dye according to claim 16, or a mixture thereof, wherein each M is sodium.
20. A dye according to claim 10 having the formula or a mixture thereof.

21. A dye according to claim 20 wherein each M is sodium.
22. A dye according to claim 20, or a mixture thereof, wherein each M is sodium.